US 9,747,345 B2

(12) United States Patent
Jensen

(10) Patent No.: US 9,747,345 B2
(45) Date of Patent: Aug. 29, 2017

(54) SYSTEM AND METHOD FOR IDENTIFYING RELATIONSHIPS IN A DATA GRAPH

(71) Applicant: Ancestry.com Operations Inc., Provo, UT (US)

(72) Inventor: Tyler S. Jensen, Mapleton, UT (US)

(73) Assignee: Ancestry.com Operations Inc., Lehi, UT (US)

(*) Notice: Subject to any disclaimer, the term of this patent is extended or adjusted under 35 U.S.C. 154(b) by 285 days.

(21) Appl. No.: 14/457,769

(22) Filed: Aug. 12, 2014

(65) Prior Publication Data
US 2016/0048517 A1    Feb. 18, 2016

(51) Int. Cl.
*G06F 17/30* (2006.01)

(52) U.S. Cl.
CPC .... *G06F 17/30522* (2013.01); *G06F 17/3053* (2013.01); *G06F 17/30312* (2013.01); *G06F 17/30424* (2013.01); *G06F 17/30958* (2013.01)

(58) Field of Classification Search
None
See application file for complete search history.

(56) References Cited

U.S. PATENT DOCUMENTS

| | | | | |
|---|---|---|---|---|
| 9,116,882 | B1* | 8/2015 | Macpherson | G06F 19/28 |
| 2005/0075917 | A1* | 4/2005 | Flores | G06Q 10/063 |
| | | | | 705/7.11 |
| 2008/0134292 | A1* | 6/2008 | Ariel | G06Q 10/109 |
| | | | | 726/3 |
| 2010/0223281 | A1* | 9/2010 | Hon | G06F 19/28 |
| | | | | 707/769 |
| 2010/0287213 | A1* | 11/2010 | Rolls | G06F 19/3443 |
| | | | | 707/803 |
| 2013/0054583 | A1* | 2/2013 | Macklem | G06F 17/30867 |
| | | | | 707/723 |

* cited by examiner

*Primary Examiner* — Taelor Kim
*Assistant Examiner* — Christopher J Raab
(74) *Attorney, Agent, or Firm* — Kilpatrick Townsend & Stockton LLP

(57) ABSTRACT

A graph database system is used to determine relationships between persons. The graph database system manages relationship data records having a compact data structure stored at a relationship database and accessed to find links or common relationships. For determining relationships between two people, the relationship records in the relationship paths for those two people are alternatively accessed and compared it to each other. Relationship records may include an identifier for a person having a relationship to a given individual, a relationship type, and a weight reflecting the confidence level or quality of the relationship.

18 Claims, 5 Drawing Sheets

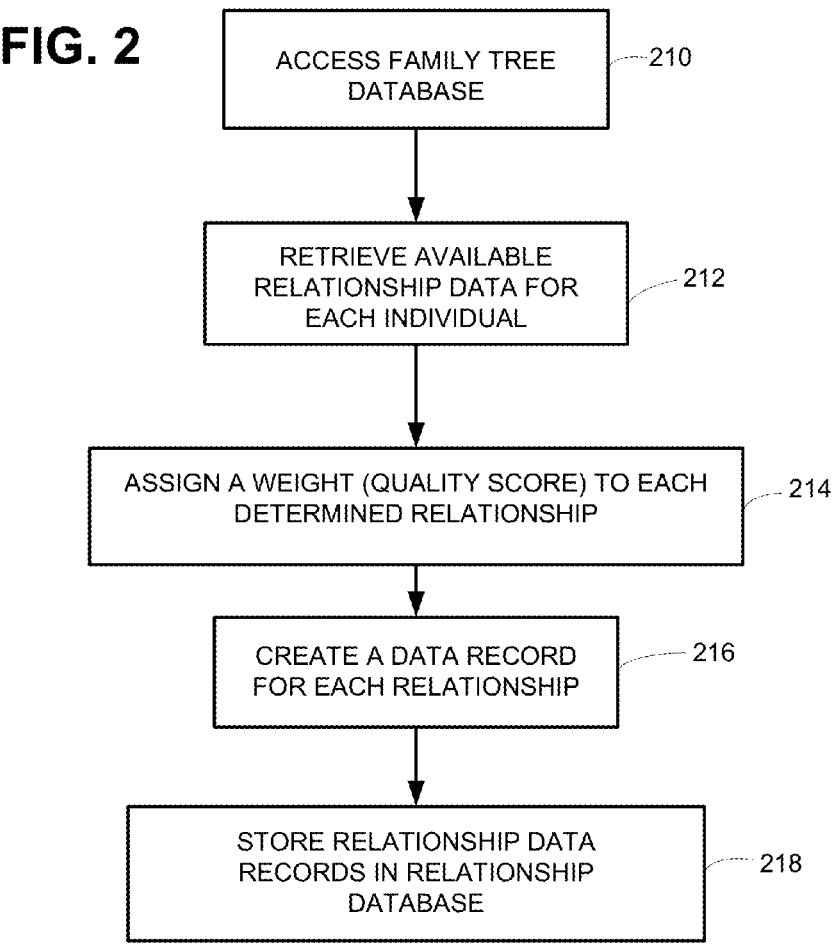

MEMORY INDEX

╱─412              ╱─414          410
    FROM     MEMORY POINTER                          ╱
     ID          (48)           EDGE (ID) COUNT(16)

ID1      XXXX ...           XXX ...
    ID2      XXXX ...           XXX ...
    ID3      XXXX ...           XXX ...
    ID4      XXXX ...           XXX ...
     ⋮          ⋮                  ⋮

MEMORY (RELATIONSHIP DATA)

╱─424
              ╱─422   RELATIONSHIP      ╱─426
           TO ID (48)    TYPE (8)       WEIGHT (8)

XXXX ...     XXX ...         XXX ...
           XXXX ...     XXX ...         XXX ...       420
           XXXX ...     XXX ...         XXX ...
              ⋮            ⋮               ⋮

FIG. 4

SYSTEM AND METHOD FOR IDENTIFYING RELATIONSHIPS IN A DATA GRAPH

BACKGROUND OF THE INVENTION

Large data graphs are used in many applications, such as genealogy and social networking. For example, a graph may represent a family tree (or a plurality of connected family trees), with each node in the graph representing a person in the tree, and with lines or connections ("edges') between nodes in the graph representing relationships between the nodes. Often, data is associated with each node that not only identifies a person but has information relating to the person (e.g., in a family tree, data at a node may include information pertaining to the person's birth, death, marriage, education, occupation, address, etc., as well as records, documents and photos concerning the person). Similarly, a graph representing a social network may use nodes to represent people and use connections or edges to represent "friendships" to other people.

A graph can be useful in representing and understanding the relationships between nodes, and retrieving data that is stored at any individual node. However, because of the amount of data stored in a large data graph, analyzing the graph can sometimes be very difficult and time-consuming. As an example, if one wanted to determine the relationship between two people without knowing much about the relationships in advance, traversing a data graph to determine the connection between those two people requires the analysis of large amounts of data. A system might need to start by initially accessing the two nodes representing the two people of interest, and then accessing all the nodes (and their data) directly or indirectly connected to the two initial nodes, extending across a large portion of the graph, until a common link is found. Traversing the graph for such purpose requires a significant amount of processing and time.

BRIEF SUMMARY OF THE INVENTION

There is provided, in accordance with embodiments of the present invention, a network/system and method for accessing a data graph of relationship data and traversing the data graph to identify a relationship between at least two items or persons.

In one embodiment, a method for determining a relationship between at least two persons of interest includes storing, in a relationship database, a data structure representing relationship data records for a large population of persons. The relationship records have data only pertaining to the relationship between persons. Each relationship record comprises, for one given person, relationship data identifying at least one other person having a relationship to the one given person. The method further includes accessing the stored relationship data records associated with a first person of interest, accessing the stored relationship data records associated with a second person of interest, comparing the accessed relationship records to determine if there is any person in common to both a relationship record associated with the first person of interest and relationship record associated with the second person of interest, and identifying any person in common.

A more complete understanding of the present invention may be derived by referring to the detailed description of the invention and to the claims, when considered in connection with the Figures.

BRIEF DESCRIPTION OF THE DRAWINGS

FIG. 2 is a flow diagram illustrating a process for using data in a family tree database to create a relationship database having compact data structures.

FIG. 3 illustrates an initial data record created from data from a family tree database, for purposes of creating a relationship database.

FIG. 4 represents a memory index and underlying relationship data stored in memory, created from initial data records, such as the data record illustrated in FIG. 3.

DETAILED DESCRIPTION OF THE INVENTION

There are various embodiments and configurations for implementing the present invention. Generally, embodiments provide systems and methods for traversing a large data graph, such as a data graph representing a large population of people and the relationships between those people. In described embodiments, family tree data and other genealogical data are used to create a data graph that has relationship data with compact data structures and that may be quickly and efficiently traversed to identify relationships between individuals.

In one particular described embodiment, one or more family tree databases are accessed to retrieve relationship data pertaining to a large population (e.g., many millions) of people. The retrieved data is used to create a data graph. The data graph includes a memory index, and a large amount of relationship data stored in memory that is accessed using the memory index. The relationship data includes data records having a compact data structure, with a limited number of data fields that store relationship data for any given individual. Specifically, in a preferred embodiment, the data fields in each data record identify a person having a relationship to a given individual, the type or nature of the relationship, and a weight or score that reflects the confidence or quality that can be attributed to the identified relationship. In this described embodiment, only relationship data (and no other, or a minimal amount of other, kinds of data) is stored in the data graph, to make the graph more easily traversed.

It should be appreciated that, in its broadest form, the present invention is not limited to identify relationships between two individuals. For example, in alternative embodiments, the relationship of a person to an event could be identified (e.g., finding a person's ancestor that is associated with an event such as the Battle of Gettysburg during the Civil War). In yet other embodiments, events, things or other items other than individuals could be linked, when the graph being searched has data representing things other than or in addition to people.

Figure 1:
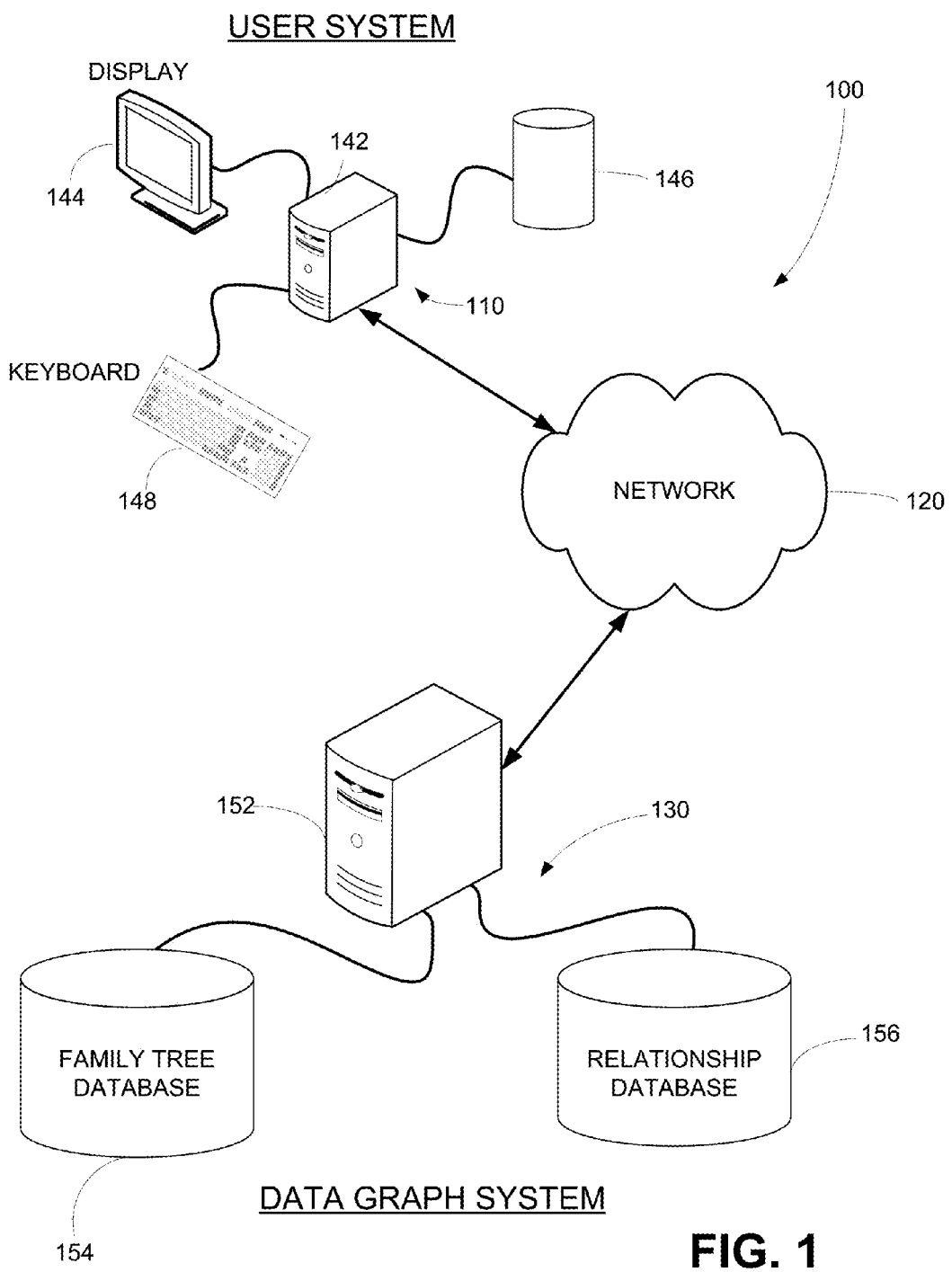
FIG. 1 is a general block diagram showing a system and network for a user to access graph data, such as data pertaining to a family tree.

Referring now to FIG. 1, a network 100 according to one embodiment of the invention is illustrated. The network 100 illustrates one of many user systems 110 that may be connected for communicating through a network 120 with a graph system 130. In the illustrated embodiment, the network 120 may be the Internet.

The user system 110 includes a computer 142 (e.g., a personal computer, laptop, notebook, mobile device or similar computing device used by an end user) connected to a data or memory device 146 and to various input/output devices, such as a computer monitor or display 144 and a keyboard 148. The graph system 130 includes a server 152 that manages a family tree database 154 and a relationship database 156.

As will be described in greater detail below, the graph server 152 accesses the family tree database 154 for purposes of collecting relationship data across many family trees that has been stored in the family tree database. Such data may be family data collected from end users that have created family trees, as well as relationship data that has been collected from many data sources, such as public records. As an example, the family tree database 154 may be of a type maintained by a genealogical service, such as Ancestry.com, where a large number of end-users have created family trees (including relationship data) and have stored that data in the database 154. The family tree database 154 may also store relationship data gleaned from public records and other sources by the genealogical service in order to establish family relationships that may be useful to end users when creating family trees. In some embodiments, the family tree database 154 may represent a large number of private and public databases, maintained by multiple different entities, such as genealogical services, libraries, government agencies and so forth. The graph server 152 uses the data stored in the family tree database 154 to build a separate data graph (stored in relationship database 156) that has compact data structures representing relationships between people.

In the described embodiment, the relationship database 156 stores relationship data pertaining to millions (perhaps even billions) of individuals (going back many generations) and permits the graph server to determine if there is a relationship between any two of those people, as will be described below. It should be appreciated that the graph system 130 is simplified and that there may, in actual practice, be a "pool" of servers represented by the graph server 152, with multiple applications running on the servers. In some cases, one or more end users at a user systems 110 may be using an application at the server to construct a family tree using the server 152 and store the family tree data in the database 154. In other instances, or concurrently with a user constructing a family tree, other users at a user systems 110 may be sending a request to the graph server 152, providing names or identifiers for two or more individuals, and requesting that the graph server 152 identify any relationships between those individuals, using the relationship database 156.

In order to create data structures that may be efficiently traversed to identify common relationships between individuals, the data in the family tree database(s) 154 is used to retrieve and process stored relationship data for the relationship database 156. This may be accomplished using the process illustrated in FIG. 2.

At step 210, the graph server 152 accesses the family tree database(s) 154 in order to obtain relationship data. The relationship data in the family tree database 154 may take a number of different forms. For example, data may be stored in the form of a traditional family trees, and the graph server 152 looks at each person in each family tree and retrieves data identifying relationships to other people, step 212. In other cases, data in the family tree database 154 may be less organized, and may consist of many individual public records, such as birth, death and marriage records, and the graph server 152 determines relationships from such records (e.g., determines that child named in a birth record has a parent/child relationship to the father and mother listed in that same birth record).

The confidence that can be attributed to relationships retrieved at step 212 may depend on the particular source of that data. For example, a reliable public record (such as a birth certificate) may be viewed with high confidence and a family tree relationship that is been built by a user (without corroborating public records) may be viewed with less confidence. Thus, at step 214, for purposes of permitting a user to consider a relationship data based on its "quality," i.e., a confidence level that can be attributed to the determined relationship, a weight score is assigned to each relationship that is retrieved from the database 154.

The weight given to individual relationship data records may be established by the entity operating the relationship database 156, based on numerous factors. As indicated earlier, factors may include the source of the data (e.g., an end user created record versus a public record created by a governmental entity). In many cases, a given relationship may be established or corroborated by a number of different sources, including government records, records published by a credible source (e.g., newspaper), and individuals creating a family tree and placing data in the database 154 or soliciting information from other users to place in database 154. The weight or score that is assigned any given relationship may reflect the quality and number of sources for a given data record. Thus a stated relationship in the family tree database 154 that has been provided by an individual may be given a higher score if there are corroborating public records referenced or stored in connection with relationship data. In some cases the weight established at step 214 may be a number, such as from 1-10, with 1 representing the lowest confidence level and 10 representing the highest confidence level. In other cases the weight may simply be a designation, such as "low," "medium," or "high."

A relationship data record is then created for each relationship retrieved from the family tree database 154, step 216. An example of a relationship data record 300 created at step 216 is illustrated in FIG. 3 and is seen as having four fields, namely, a "From ID" field 310, a "To ID" field 312, a "Relationship Type" field 314, and a "Weight" field 316. The From ID field is populated with a unique identifier or number identifying a given individual for whom relationships to other individuals have been established. The To ID field is a similar identifier/number, but identifying a person that is related to the given individual. The Relationship Type field represents the nature of relationship of the person identified in the From ID and the person identified in the To ID, such as mother, father, son, or daughter. In some instances, a relationship search may be desired for only lineal descendants and ancestors, and in other cases less direct relationships may be desired, such as spouses, siblings, step parents, step children, etc. Thus, in establishing the data record 300, the Relationship Type field 314 may be populated with as many different types of relationships as possible, to provide the largest number of possible relationships for the person conducting a search using the relationship database 156.

At step 216, relationship records are then stored in the relationship database 156.

It should be appreciated that using a compact data structure to represent each relationship makes it easier to traverse the large number of relationship data records represented as a data graph in the relationship database 156. While the relationship data record 300 has a fairly compact data structure, in one embodiment such structure may be further simplified and reduced when stored in the relationship database at step 218. This is illustrated in FIG. 4, which depicts a memory index 410 that is used to access relationship data 420. The relationship data illustrated in FIG. 4 is for one person represented by a single From ID, although similar data would be stored for any person having stored relationship data. Both the memory index 410 and the relationship data 420 may be stored in data memory at the database 156.

The purpose of the arrangement illustrated in FIG. 4 is to permit more rapid and efficient retrieval of relationship data associated with a given individual (the person identified by the "From ID"). This is accomplished by organizing the memory index such that index pointers associated with From IDs are stored sequentially in the memory index. Thus, as illustrated, the first entry in the memory index 410 is associated with the first From ID ("ID1"), the second entry in the memory index 410 is associated with the second From ID ("ID2"), and so forth. Accordingly, the actual From IDs are not stored (and have no need to be stored) in the memory index, but rather are "implied" (as represented by dotted lines in FIG. 4). As seen in FIG. 4, there is associated with each From ID a 48 bit memory pointer field 412 having data that point to the starting position of relationship data in memory 420 for the given From ID, and a 16 bit Edge Count field 414 having data that represents the number of relationship data record segments associated with the given From ID (i.e., data record segments following the starting position in memory pointed to by the memory pointer field 412).

FIG. 4 illustrates a set of relationship data segments associated with one From ID, pointed to by the memory index 410. Each memory segment includes a 48 bit To ID 422 (identifying the person that is related to the person identified by the From ID), an 8 bit Relationship Type for that person, and an 8 bit Weight that is assigned to the relationship. It should be appreciated that, while only three relationship data segments are illustrated as populated in FIG. 4, depending on the number of relationships associated with the individual represented by a single From ID, there could be a larger number of such relationship data segments. In many cases, the relationship data segments for a given individual may be located in sequential order in locations within relationship database 156 (beginning with the initial location identified by the memory pointer field 412 to the final location indicated by the Edge Count field 414). However, it should be appreciated that, over time, as relationship data from the family tree databases 154 is updated and periodically reviewed, additional relationships may be identified and stored in association with a single From ID. For purposes efficiently managing the memory, if there are more relationship data segments than available sequential locations, the last relationship data segment indicated by the Edge Count filed 414 may include a flag (not shown) designating the data segment as a pointer to a memory address elsewhere in the relationship database 156 (along with an edge count) that directs the system to the next relationship data segment.

Figure 5:
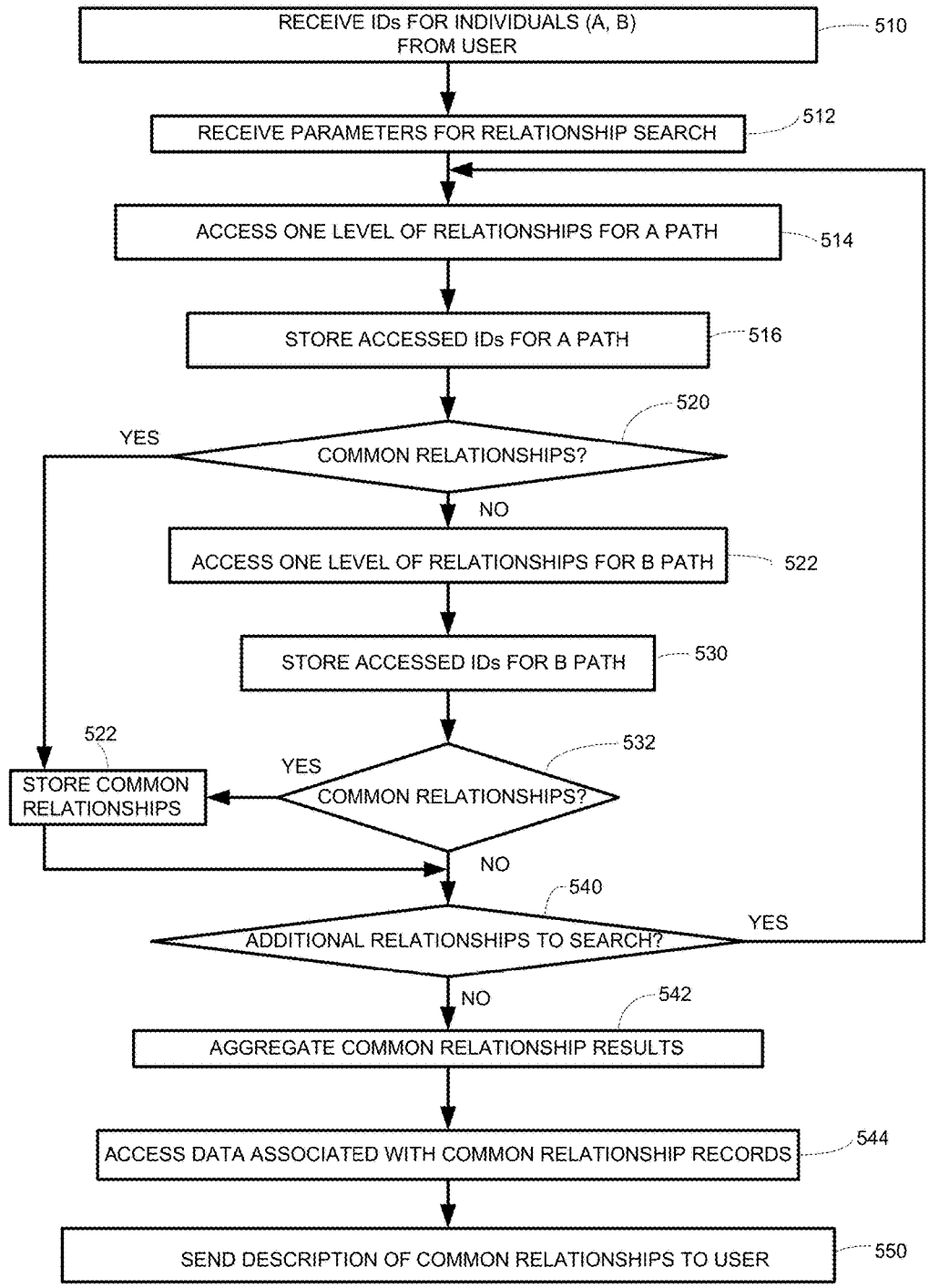
FIG. 5 is a flow diagram illustrating a process for using a relationship database to determine one or more common relationships between two or more individuals.

Turning now to FIG. 5, there is illustrated a process for identifying a common relationship between two individuals, using graph system 130. At step 510, the graph server 152 receives IDs for two individuals or persons (A, B) of interest for whom the user would like to identify any common relationship. In addition to receiving IDs for the persons of interest, the user is also prompted to provide parameters for the relationship search to be conducted, step 512. Examples of parameters that may be provided would include the scope of relationship types to be searched (e.g., only direct lineal relationships or, alternatively, a broader range of relationships, such as spouses, siblings, step parents, step children, etc.). In addition, in order to provide an upper limit on the number of generations/data records to be searched, one parameter might include a limit on the number of nodes to be checked. This limit could be large but, among other things, prevents a system from continuing to search when enough nodes in the database have been searched and any further searching would be time consuming and likely reveal only very weak relationships. Also, another parameter might be a filter for relationships that do not have a sufficiently high weight. For example, a user might specify that any relationship having a low value/weight should be filtered out of the search results.

The IDs provided at step 510 and the parameters for the search provided at step 512 are stored (in a queue) and then used to begin the search at step 514, at which one level of relationships for one of the individuals (i.e., one level in a path of relationships from Individual A) is accessed for relationships. Individual A has its From ID searched for relationship data segments within relationship database 156, and each identified To ID representing a person having a relationship to Individual A (as well as that person's relationship type and relationship weight—see FIG. 4) are retrieved and stored in the queue, step 516.

The graph server uses the To IDs that have been located and stored to determine if there are common relationships at step 520, by comparing each of the located To IDs to the ID for Individual B. If a common relationship is found at step 520, that relationship is stored at step 522. As should be appreciated, in most cases it would be unlikely that a search would yield in a match after only one level of searching at step 514 (the user would have likely known of any such direct relationship), and so if no common relationships are found at step 520, then one level of relationships pertaining to Individual B is accessed at step 522, with any To IDs located within relationship database 156 stored in a queue at step 530. The graph server again determines if there are any common relationships, by comparing all IDs thus far accessed to each other to see if there are any in common, step 532. If there are, those common relationships are stored at step 522. Otherwise, the graph server determines if additional relationships are to be searched at step 540.

Step 540 is used by the graph server 152 to determine whether the search should be continued. Of course, in the initial phases of the search, the searching would likely continue, but after in the search has reached the limits of the search parameters received at step 512 (e.g., a large number of nodes have been checked, or a sufficient number of common relationships with higher weights have been located), the search might be discontinued and the process proceeds to step 542, where common relationship results are aggregated.

In the early phases of the search, when common relationships have yet to be identified, the process continues back to step 514 and the graph server continues to check for relationships in further generational levels from individual A (steps 514-520) and in further generational levels from Individual B (steps 522-532), with any common relationships stored at step 522 until the limits of the search have been reached at step 540. It should be appreciated that in determining whether to continue a search at step 540, the weights of common relationships may be determined. For example, if the user has specified that common relationships should have a relatively high weight, and no such relationships have been uncovered, then the searching would continue at least until a limit on the number of people and nodes has been reached.

Assuming that common relationships have been located and have been aggregated at step 542, with the scope of the searching completed using the parameters set by the user, then located common relationships are used to access data that will be more useful to the user. For example, if a number of IDs have been identified for persons that link Individual A and Individual B, those IDs may be used by the graph server 152 to find additional data pertaining to those persons. Specifically, personal information (name, date of birth, date of death, etc.), as well as a specific relationship determined by the link (specifying, e.g., that Individual A is "fourth cousin, twice removed" of Individual B) may be determined and then provided to the user at step 550.

It should be appreciated that while the embodiment illustrated in the process of FIG. 5 involves determining a link between only two given individuals, the process could be used to find links between a given individual and a plurality of other given individuals (e.g., finding a link between an Individual A and any one or more of Individuals B, C, D, E, F, and so forth).

Figure 6:
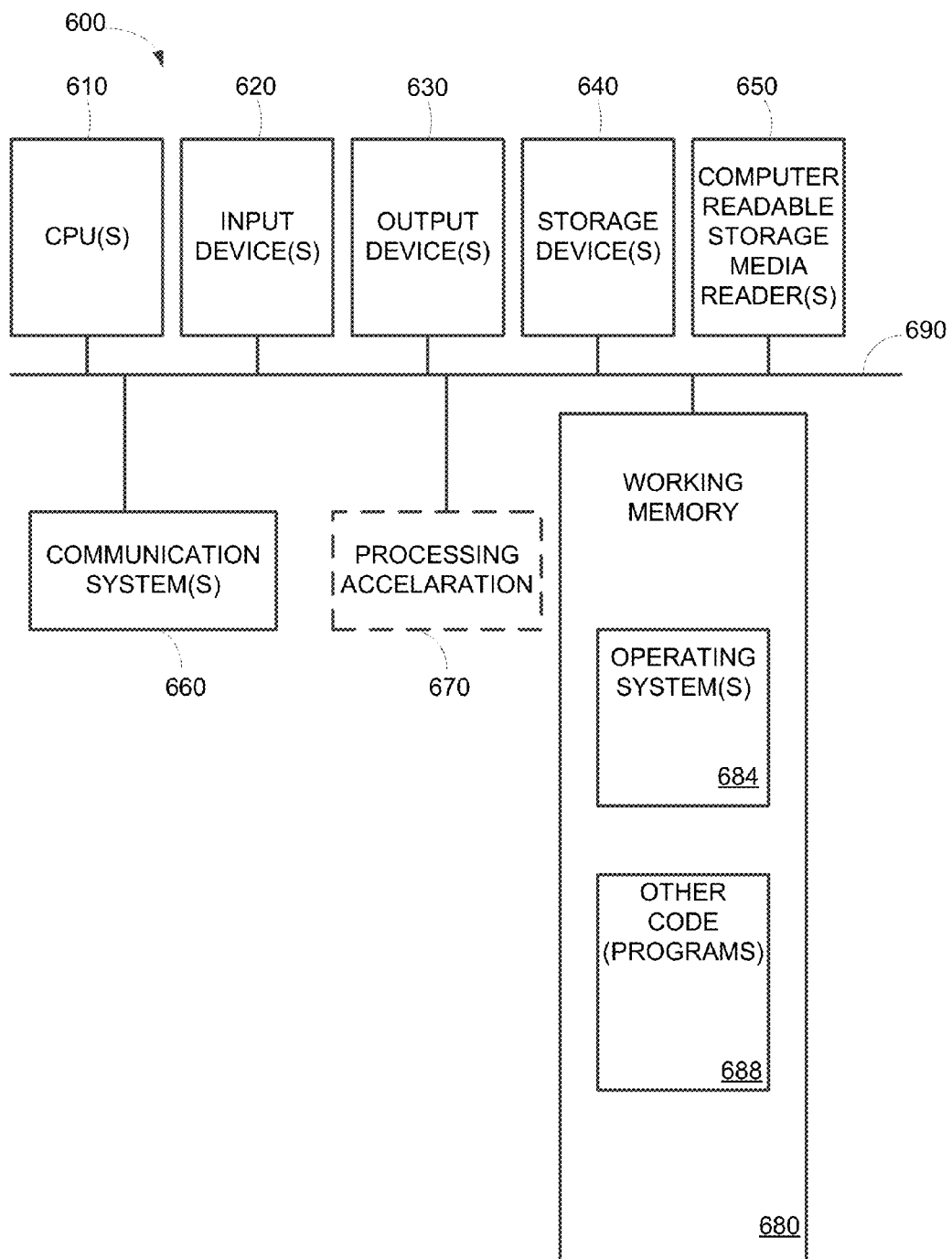
FIG. 6 is a block diagram illustrating a computer system for implementing various embodiments of the invention.

FIG. 6 is a block diagram illustrating an exemplary computer system upon which embodiments of the present invention may be implemented. This example illustrates a computer system 600 such as may be used, in whole, in part, or with various modifications, to provide the functions of the graph system 130, as well as other components and functions of the invention described herein.

The computer system 600 is shown comprising hardware elements that may be electrically coupled via a bus 690. The hardware elements may include one or more central processing units 610, one or more input devices 620 (e.g., a mouse, a keyboard, etc.), and one or more output devices 630 (e.g., a display device, a printer, etc.). The computer system 600 may also include one or more storage devices 640, representing remote, local, fixed, and/or removable storage devices and storage media for temporarily and/or more permanently containing computer-readable information, and one or more storage media reader(s) 650 for accessing the storage device(s) 640. By way of example, storage device(s) 640 may be disk drives, optical storage devices, solid-state storage devices such as a random access memory ("RAM") and/or a read-only memory ("ROM"), which can be programmable, flash-updateable or the like.

The computer system 600 may additionally include a communications system 660 (e.g., a modem, a network card—wireless or wired, an infra-red communication device, a Bluetooth™ device, a near field communications (NFC) device, a cellular communication device, etc.). The communications system 660 may permit data to be exchanged with a network, system, computer, mobile device and/or other component as described earlier. The system 600 also includes working memory 680, which may include RAM and ROM devices as described above. In some embodiments, the computer system 600 may also include a processing acceleration unit 670, which can include a digital signal processor, a special-purpose processor and/or the like.

The computer system 600 may also comprise software elements, shown as being located within a working memory 680, including an operating system 684 and/or other code 688. Software code 688 may be used for implementing functions of various elements of the architecture as described herein. For example, software stored on and/or executed by a computer system, such as system 600, can be used in implementing the processes seen in FIGS. 2 and 5.

It should be appreciated that alternative embodiments of a computer system 600 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the graph system 130 may be implemented by a single system having one or more storage device and processing elements. As another example, the graph system 130 may be implemented by plural systems, with their respective functions distributed across different systems either in one location or across a plurality of linked locations.

Moreover, while the various flows and processes described herein (e.g., those illustrated in FIGS. 2 and 5) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

While a detailed description of presently preferred embodiments of the invention has been given above, various alternatives, modifications, and equivalents will be apparent to those skilled in the art without varying from the spirit of the invention. Therefore, the above description should not be taken as limiting the scope of the invention, which is defined by the appended claim.

What is claimed is:

1. A method for determining a relationship between at least two persons of interest, comprising:

creating, by a graph server, from genealogical data stored in one or more databases, a data structure representing relationship data records for a large population of persons, the relationship data records each having only data pertaining to the relationship between two persons, each individual relationship data record having a compact structure comprising a From ID identifying one given person, a To ID identifying one other person having a relationship to the one given person, and relationship data pertaining to the relationship between the one given person and the one other person;

storing, in a relationship database, the data structure;

accessing each of the individual stored relationship data records associated with a first person of interest;

accessing each of the individual stored relationship data records associated with a second person of interest;

comparing the accessed relationship data records to determine if there is any person in common to both a relationship data record associated with the first person of interest and relationship data record associated with the second person of interest, by comparing at the graph server each To ID in the individual relationship data records associated with the first person of interest to each To ID in the individual relationship data records associated with the second person of interest;

if comparing the accessed relationship data records determines there is no person in common between the relationship data records associated with the first person of interest and the second person of interest, then accessing the relationship data records associated with each other person having a relationship to the first person of interest;

accessing the relationship data records associated with each other person having a relationship to the second person of interest;

comparing the accessed relationship data records associated with each other person having a relationship to the first person of interest to the accessed relationship data records associated with each other person having a relationship to the second person of interest, to determine at least one person in common; and identifying the at least one person in common.

2. The method of claim 1, wherein each relationship data record further comprises relationship type data identifying the type of the relationship between the one given person and the other person.

3. The method of claim 2, wherein the type of the relationship between the one given person and the other person comprises one of at least father, mother, son, daughter.

4. The method of claim 1, further comprising:

prior to accessing the stored relationship data records associated with a second person of interest, first comparing the accessed relationship data records associated with a first person of interest with data identifying the second person of interest to determine if any of the at least one other person having a relationship to the first person of interest is the same as the second person of interest, and if not, then accessing the stored relationship data records associated with the second person of interest.

5. The method of claim 1, further comprising:

determining a weight associated with a relationship identified between the one given person and the at least one other person having a relationship to the one given person, based on the likely accuracy of that relationship; and storing the weight in association with the relationship data identifying the at least one other person having a relationship to the one given person.

6. The method of claim 1, wherein accessing the stored relationship data records is in response to a request from a user to locate any person in common, and wherein any identified person in common is provided to the user, and wherein the method further comprises:

aggregating each identified person in common in preparing an answer in response to the request from the user;

receiving a pre-established weight from the user in order to filter the answer; and filtering the answer to remove an identified person in common based on the predetermined weight.

7. The method of claim 1, further comprising:

determining the relationship path between the first person of interest in the second person of interest based on the any identified person in common;

retrieving data from a genealogical database pertaining to any person in the relationship path between the first person of interest and the second person of interest; and providing retrieved data from the genealogical database along with any identified person in common.

8. The method of claim 1, wherein accessing the stored relationship data records, comparing the accessed relationship data records, and identifying any person in common are performed by the graph server in response to receiving, at the graph sever, a request from a user to locate any person in common.

9. The method of claim 1, wherein a personal identifier is associated with each person in the population of persons, wherein the From ID identifying one given person and the To ID identifying one other person comprise the personal identifier associated with that person.

10. A graph system for determining a relationship between at least two persons of interest, comprising:

a relationship database storing a data structure, the data structure representing relationship data records for a large population of persons, the relationship data records each having data only pertaining to the relationship between two persons, each individual relationship data record having a compact structure comprising a From ID identifying one given person, a To ID identifying one other person having a relationship to the one given person, and relationship data pertaining to the identifying at least one other person having a relationship between the one given person and the one other person;

a graph server comprising a processor and a memory, the memory storing instructions that are executable by the processor and configure the graph server to:

create the data structure from genealogical data stored in one or more databases;

access, in the relationship database, each of the individual stored relationship data records associated with a first person of interest;

access, in the relationship database, each of the individual stored relationship data records associated with a second person of interest;

compare the accessed relationship data records to determine if there is any person in common to both a relationship data record associated with the first person of interest and relationship data record associated with the second person of interest, by comparing each To ID in the individual relationship data records associated with the first person of interest to each To ID in the individual relationship data records associated with the second person of interest;

if comparing the accessed relationship data records determines there is no person in common between the relationship data records associated with the first person of interest in the second person of interest, then access the relationship data records associated with each other person having a relationship to the first person of interest;

access the relationship data records associated with each other person having a relationship to the second person of interest;

compare the accessed relationship data records associated with each other person having a relationship to the first person of interest to the accessed relationship data records associated with each other person having a relationship to the second person of interest, to determine at least one person in common; and identify the at least one person in common.

11. The system of claim 10, wherein each relationship data record further comprises relationship type data identifying the type of the relationship between the one given person and the other person.

12. The system of claim 11, wherein the type of the relationship between the one given person and the other person comprises one of at least father, mother, son, daughter.

13. The system of claim 10, wherein the graph server is further configured to:

prior to accessing the stored relationship data records associated with a second person of interest, first comparing the accessed relationship data records associated with a first person of interest with data identifying the second person of interest to determine if any of the at least one other person having a relationship to the first person of interest is the same as the second person of interest, and if not, then accessing the stored relationship data records associated with the second person of interest.

14. The system of claim 10, wherein the graph server is further configured to:

determine a weight associated with a relationship identified between the one given person and the at least one other person having a relationship to the one given person, based on the likely accuracy of that relationship; and store the weight in association with the relationship data identifying the at least one other person having a relationship to the one given person.

15. The system of claim 10, wherein accessing the stored relationship data records is in response to a request from a user to locate any person in common, and wherein any identified person in common is provided to the user, and wherein the graph server is further configured to:

aggregate each identified person in common in preparing an answer in response to the request from the user;

receive a pre-established weight from the user in order to filter the answer; and filter the answer to remove an identified person in common based on the predetermined weight.

16. The system of claim 10, wherein the graph server is further configured to:

determine the relationship path between the first person of interest in the second person of interest based on the any identified person in common;

retrieve data from a genealogical database pertaining to any person in the relationship path between the first person of interest and the second person of interest; and provide retrieved data from the genealogical database along with any identified person in common.

17. The system of claim 10, wherein accessing the stored relationship data records, comparing the accessed relationship data records, and identifying any person in common are performed by the graph server in response to receiving, at the graph sever, a request from a user to locate any person in common.

18. The system of claim 10, wherein a personal identifier is associated with each person in the population of persons, wherein the relationship data identifying at least one other person having a relationship to the one given person comprises the personal identifier for the one other person, and wherein comparing the accessed relationship records comprises:

comparing, in the accessed relationship records, the personal identifier associated with each other person having a relationship to the first person of interest with the personal identifier associated with each other person having a relationship to the second person of interest.

* * * * *